United States Patent
Shiau et al.

(10) Patent No.: US 7,522,802 B2
(45) Date of Patent: Apr. 21, 2009

(54) OPTICAL MULTILAYER FILM AND A BACKLIGHT MODULE UTILIZING THE SAME

(75) Inventors: Tzeng-Ke Shiau, Chu Nan (TW);
Ming-Dah Liu, Chu Nan (TW);
Der-Woei Hsaio, Chu Nan (TW);
Wen-Bin Chou, Chu Nan (TW);
Ching-Shiang Li, Chu Nan (TW)

(73) Assignee: Coretronic Corporation, Miao Li County (TW)

( * ) Notice: Subject to any disclaimer, the term of this patent is extended or adjusted under 35 U.S.C. 154(b) by 0 days.

(21) Appl. No.: 11/827,746

(22) Filed: Jul. 13, 2007

(65) Prior Publication Data
US 2008/0062719 A1 Mar. 13, 2008

(30) Foreign Application Priority Data
Sep. 11, 2006 (TW) .............................. 95133457 A

(51) Int. Cl.
*G02B 6/10* (2006.01)
*F21V 7/04* (2006.01)

(52) U.S. Cl. ...................................... 385/131; 362/617

(58) Field of Classification Search ................. 362/616, 362/619, 629, 617; 385/131
See application file for complete search history.

(56) References Cited

U.S. PATENT DOCUMENTS

| | | | | |
|---|---|---|---|---|
| 6,335,999 | B1 | 1/2002 | Winston et al. | 385/146 |
| 6,811,274 | B2 * | 11/2004 | Olczak | 362/606 |
| 7,387,423 | B2 * | 6/2008 | Leu et al. | 362/627 |
| 2004/0150772 | A1 | 8/2004 | Faris et al. | 349/115 |
| 2007/0231561 | A1 * | 10/2007 | Pellerite et al. | 428/323 |
| 2008/0055881 | A1 * | 3/2008 | O'Neill et al. | 362/19 |

* cited by examiner

*Primary Examiner*—John A Ward
(74) *Attorney, Agent, or Firm*—Ladas & Parry LLP

(57) ABSTRACT

An optical multilayer film includes first and second optical layers, and a refracting layer. The first optical layer has a light-exit surface. The second optical layer has a light-incoming surface facing the light-exit surface of the first optical layer, and a light-outgoing surface opposite to the light-incoming surface and formed with a light-converging structure. The refracting layer is disposed between and is in contact with the first and second optical layers, is made from a transparent material, and has a refractive index that is smaller than that of the second optical layer.

16 Claims, 3 Drawing Sheets

OPTICAL MULTILAYER FILM AND A BACKLIGHT MODULE UTILIZING THE SAME

CROSS-REFERENCE TO RELATED APPLICATION

This application claims priority of Taiwanese Application No. 095133457, filed on Sep. 11, 2006.

BACKGROUND OF THE INVENTION

1. Field of the Invention

The invention relates to an optical device, more particularly to an optical multilayer film and a backlight module utilizing the same.

2. Description of the Related Art

As shown in FIG. 1, a conventional backlight module serving as a planar light source for a liquid crystal display (LCD) includes a brightness enhancement film (BEF) 11 for enhancing luminance brightness of on-axis light beams, and at least one diffuser film 12 disposed adjacent to the brightness enhancement film 11 for homogenizing light beams incident thereupon which is emitted from a light source unit 14 or reflected by a reflector 15. The on-axis light beams is referred to as light beams that travel substantially parallel to an optical axis (OA') of the backlight module, i.e., light beams that emerge substantially perpendicularly from the backlight module.

The brightness enhancement film 11 can be a commercially available one that is manufactured by 3M United States, and that is made from a transparent material and has a smooth light-incident surface 111, and a light-exit surface 112 formed with a prismatic structured array. The prismatic structured array has the function of directing off-axis light beams (i.e., light beams traveling divergently from the optical axis (OA')) toward the optical axis (OA'), thereby homogenizing the light beams and enhancing the brightness of illumination provided by the conventional backlight module.

Moreover, a tiny air gap 13 is often purposely left between the brightness enhancement film 11 and the diffuser film 12 in order to enhance the ability to direct off-axis light beams toward the optical axis (OA'). Difference between the refractive index of air in the air gap 13 and that of the brightness enhancement film 11 directs the off-axis light beams toward the optical axis (OA') as the off-axis light beams travel through the air gap 13 to the light-incident surface 111 of the brightness enhancement film 11.

The air gap 13 naturally exists between the brightness enhancement film 11 and the diffuser film 12 with no additional means necessary when the two films 11, 12 are assembled into a backlight module.

However, since no structural support or coupling means is present between the brightness enhancement and diffuser films 11, 12, width of the air gap 13 (i.e., the interval between the brightness enhancement and diffuser films 11, 12) varies easily due to deformation of the brightness enhancement and diffuser films 11, 12. It is even possible for the air gap 13 to disappear if the brightness enhancement film 11 and the diffuser film 12 are in direct contact with each other, which deteriorates refraction characteristic at the light-incident surface 111 of the brightness enhancement film 11.

Moreover, the brightness enhancement film 11 and the diffuser film 12 are required to be assembled separately in different steps during assembly of the conventional backlight module. This assembly procedure is not only relatively troublesome, but it is also possible for dust to enter the air gap 13 between the brightness enhancement film 11 and the diffuser film 12 such that the overall optical characteristics of the conventional backlight module are degraded.

SUMMARY OF THE INVENTION

Therefore, the object of the present invention is to provide an optical multilayer film that is capable of improving stability of optical characteristics of a backlight module.

Another object of the present invention is to provide an optical multilayer film that is capable of simplifying the assembly of a backlight module.

According to one aspect of the present invention, there is provided an optical multilayer film that includes first and second optical layers, and a refracting layer. The first optical layer has a light-exit surface. The second optical layer has a light-incoming surface facing the light-exit surface of the first optical layer, and a light-outgoing surface opposite to the light-incoming surface and formed with a light-converging structure. The refracting layer is disposed between and is in contact with the first and second optical layers, is made from a transparent material, and has a refractive index that is smaller than that of the second optical layer.

According to another aspect of the present invention, there is provided a backlight module that includes at least one light source unit, a reflector, and a optical multilayer film. The reflector has a reflective surface. The at least one light source unit is disposed in a space defined by the reflector. The optical multilayer film is disposed over the reflector, and includes first and second optical layers and a refracting layer. The first optical layer has a light-incident surface facing the light source unit, and a light-exit surface opposite to the light-incident surface. The second optical layer has a light-incoming surface facing the light-exit surface of the first optical layer, and a light-outgoing surface opposite to the light-incoming surface and formed with a light-converging structure. The refracting layer is disposed between and is in contact with the first and second optical layers, is made from a transparent material, and has a refractive index that is smaller than that of the second optical layer.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

In the following detailed description of the preferred embodiments, reference is made to the accompanying drawings which form a part hereof, and in which is shown by way of illustration specific embodiments in which the invention may be practiced. In this regard, directional terminology, such as "over," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "facing," "faces" and variations thereof herein are used broadly and encompass direct and indirect facing. Accordingly, the drawings and descriptions will be regarded as illustrative in nature and not as restrictive.

Figure 2:
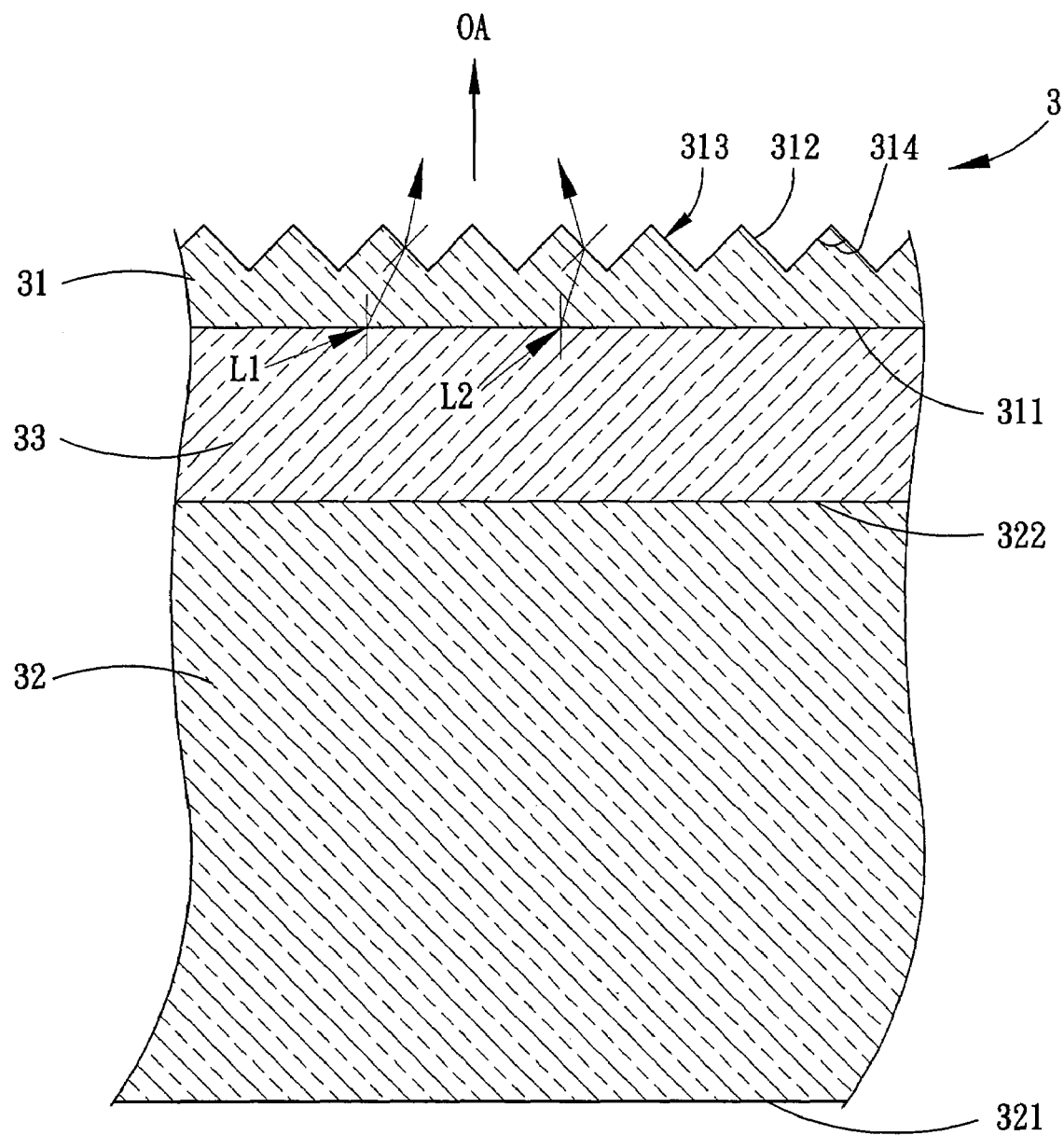
FIG. 2 is a fragmentary sectional view of the preferred embodiment of an optical multilayer film according to the present invention.

As shown in FIG. 2, an optical multilayer film according to a preferred embodiment of the present invention includes a first optical layer 32, a second optical layer 31, and a refracting layer 33 disposed between and in contact with the first and second optical layers 32, 31. Refractive index of the refracting layer 33 is smaller than that of the second optical layer 31.

The first optical layer 32 is made from a transparent material, and can be a diffuser layer. The first optical layer 32 has a light-incident surface 321 and a light-exit surface 322 opposite to the light-incident surface 321. The first optical layer 32 has a plurality of microscopic scattering particles (not shown) blended therein between the light-incident surface 321 and the light-exit surface 322 to have an optical diffusing effect by refracting, reflecting, and scattering light beams. Light beams traveling from the light-incident surface 321, through the first optical layer 32, and exiting the light-exit surface 322 are homogenized by the microscopic scattering particles through the optical diffusing effect. Since the structure and manufacturing method of the first optical layer 32 are known in the art, further details of the same are omitted herein for the sake of brevity.

The second optical layer 31 is made from a transparent material, and can be a brightness enhancement layer. The second optical layer 31 has a light-incoming surface 311 facing the light-exit surface 322 of the first optical layer 32, and a light-outgoing surface 312 opposite to the light-incoming surface 311 and formed with a light-converging structure 313. In this embodiment, the light-converging structure 313 is a prismatic structured array. Each prism structure of the prismatic structured array has an isosceles triangular shape, whose vertex angle 314 is 90 degrees. The formation of the light-converging structure 313 on the light-outgoing surface 312 enables homogenization of off-axis light beams (L1), (L2) such that the off-axis light beams (L1), (L2) converge toward an optical axis (OA) of the optical multilayer film so as to increase the luminance brightness of on-axis light beams. In practice, the vertex angle 314 is not limited to 90 degrees as in this embodiment, but can be any angle falling within the range from 50 to 130 degrees. Moreover, the shape of the prism structures of the prismatic structured array is not limited to an isosceles triangle. Furthermore, the light-converging structure 313 can be any surface structure that is capable of homogenizing light, such as a wave structured array, a cone structured array, a semi-spherical structured array, etc., in other embodiments of the present invention. Since the structure and manufacturing method of the second optical layer 31 are known in the art, further details of the same are omitted herein for the sake of brevity.

The refracting layer 33 is made from a transparent material, and is disposed between and is in contact with the first and second optical layers 32, 31. The refractive index of the refracting layer 33 is smaller than that of the second optical layer 31 and is greater than that of air. Preferably, the refractive index of the refracting layer 33 is not less than that of the first optical layer 32. Due to the difference in the refractive indices between the refracting layer 33 and the second optical layer 31, the off-axis light beams (L1), (L2) traveling from the refracting layer 33 into the second optical layer 31 converge toward the optical axis (OA) at the light-incoming surface 311 of the second optical layer 31.

The material for the refracting layer 33 can be an adhesive material or a resin material that has a relatively low refractive index and that is highly transparent. During the actual manufacture of the optical multilayer film according to the present invention, the first and second optical layers 32, 31 are made individually in advance, or are purchased directly in the form of a diffuser film and a brightness enhancement film to form the first and second optical layers 32, 31, respectively. Subsequently, the material for the refracting layer 33 is coated on the first optical layer 32, and the second optical layer 31 is then stacked on the coated material. Finally, the coated material for the refracting layer 33 is cured to connect the first and second optical layers 31, 32 such that the first and second optical layers 31, 32 are in contact with the cured material, at which point the optical multilayer film is fully constructed.

Table 1 provided hereinbelow shows the increase in luminance brightness of on-axis light beams traveling through the optical multilayer film according to the present invention in terms of optical gain as calculated by optical simulation software for various values of the difference in refractive indices between the refracting layer 33 and the second optical layer 31. It should be noted herein that the optical gain in the absence of the refracting layer 33 and the second optical layer 31 is set to be one.

TABLE 1

|  | Sample 1 | Sample 2 | Sample 3 | Sample 4 |
|---|---|---|---|---|
| Refractive index of the refracting layer | 1.45 | 1.45 | 1.30 | 1.30 |
| Refractive index of the second optical layer | 1.55 | 1.65 | 1.70 | 1.90 |
| Difference in refractive indices | 0.1 | 0.2 | 0.4 | 0.6 |
| Optical gain | 1.05 | 1.09 | 1.20 | 1.42 |

It can be seen from Table 1 that as the difference in refractive indices between the refracting layer 33 and the second optical layer 31 increases, the optical gain of the optical multilayer film according to the present invention increases, which indicates that the luminance brightness of the on-axis light beams increases as well.

Figure 1:
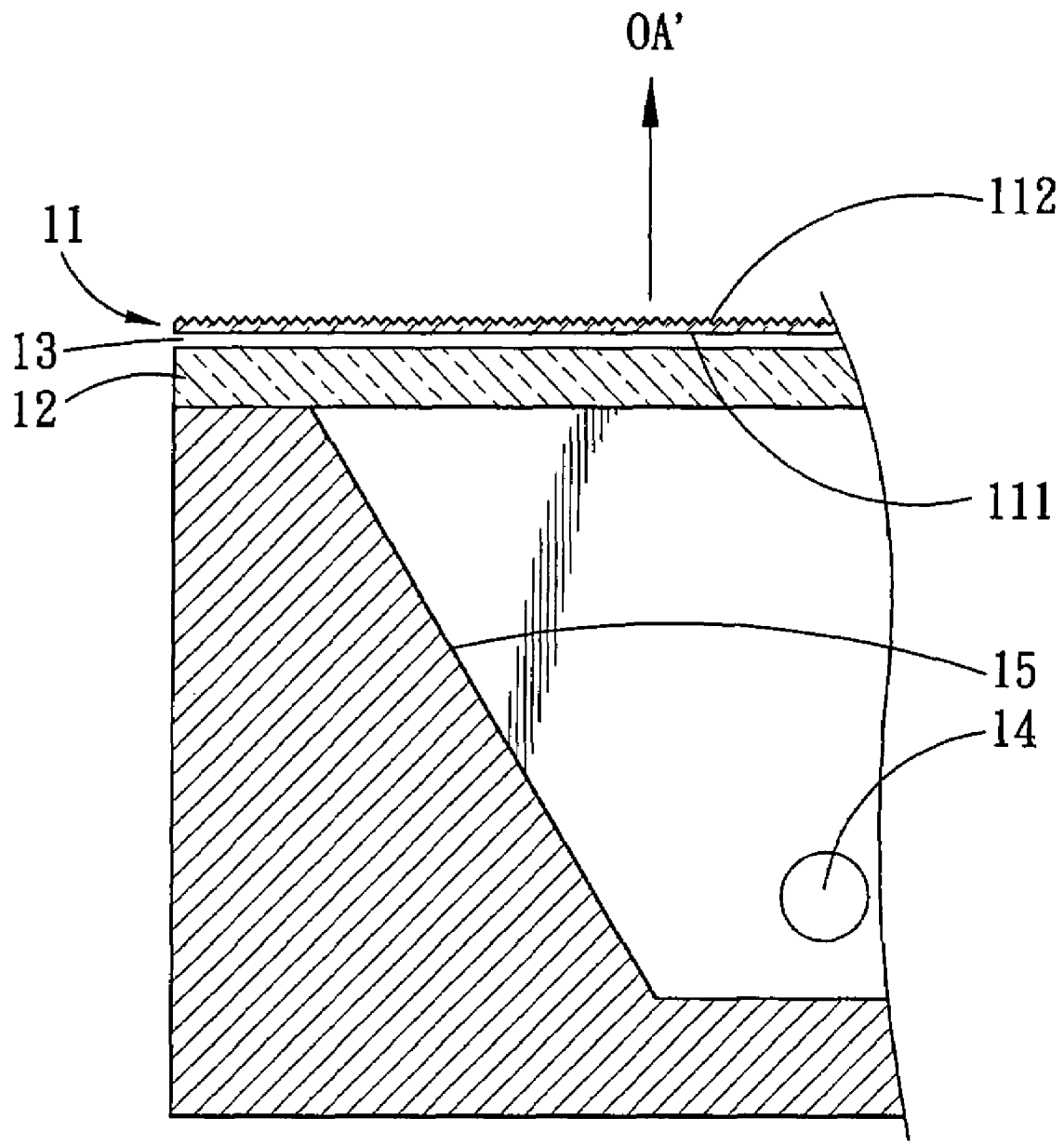
FIG. 1 is a fragmentary schematic sectional view of a conventional backlight module.

By forming the refracting layer 33 in contact with and between the second optical layer 31 and the first optical layer 32, stability of the optical characteristics associated with the prior art, where the refracting layer 33 is substituted with an air gap 13 (shown in FIG. 1), is improved.

Figure 3:
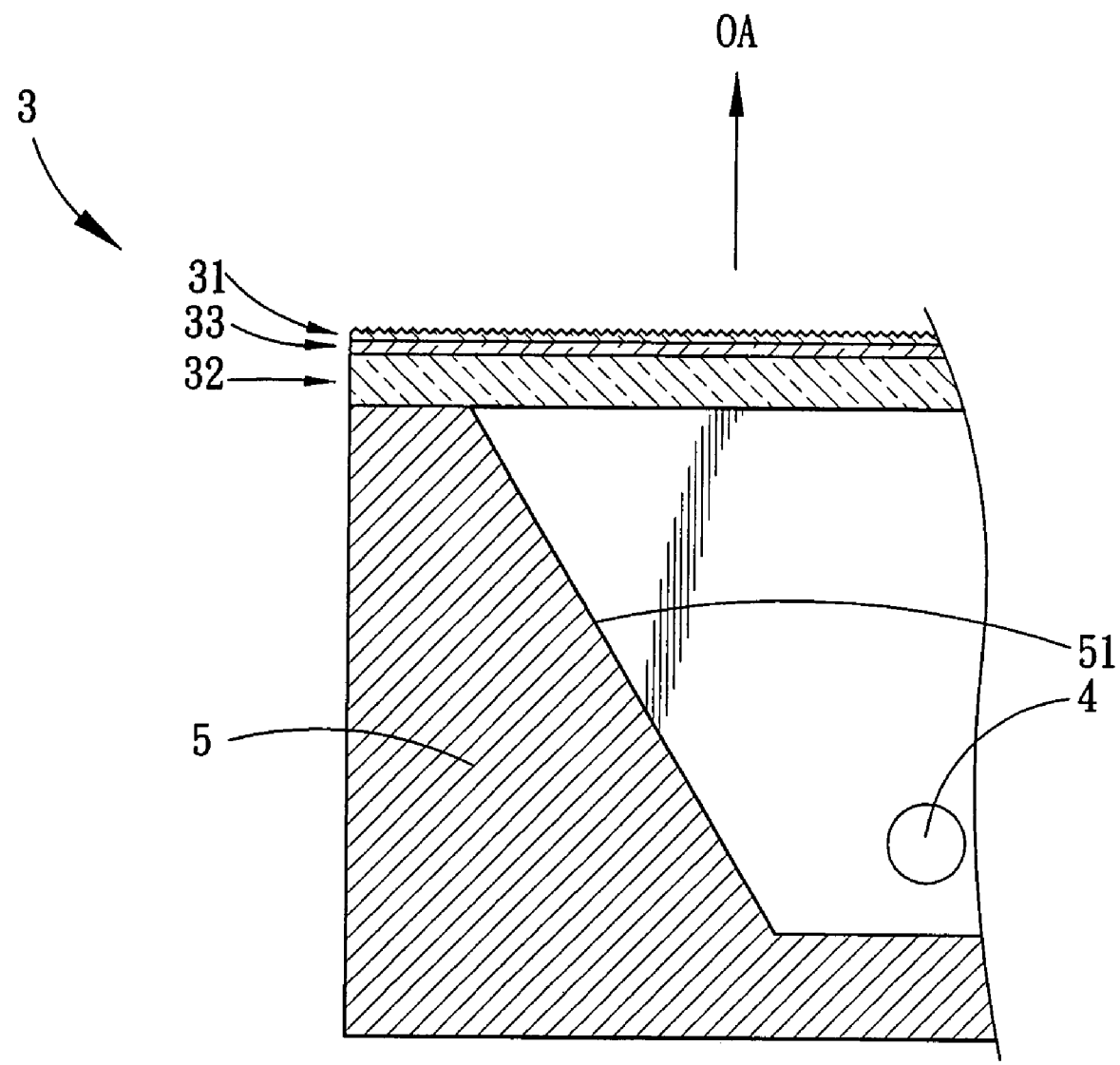
FIG. 3 is a fragmentary schematic sectional view of a backlight module utilizing the preferred embodiment of the optical multilayer film according to the present invention.

FIG. 3 illustrates a backlight module utilizing the preferred embodiment of the optical multilayer film according to the present invention. The backlight module includes a reflector 5 having a reflective surface 51, at least one light source unit 4 disposed in the reflector 5, and the optical multilayer film 3 disposed on the reflector 5. In this embodiment, the light source unit 4 is a cold cathode fluorescent lamp (CCFL) unit, but it can also be a light emitting diode (LED) lamp unit in practice. In other embodiments of the present invention, a light guiding plate (not shown) can be included in the backlight module, where the light guiding plate is disposed in the reflector 5; the light source unit 4 is at least disposed at one side of the light guiding plate, and the optical multilayer film 3 is disposed over the light guiding plate so that the light emitted by the light source unit 4 is guided toward the optical multilayer film 3 by the light guiding plate.

According to the embodiments of the present invention, through the optical diffusing effect exerted by the first optical layer 32, light beams emitted by the light source unit 4, reflected by the reflective surface 51 of the reflector 5, or guided by the light guiding plate are homogenized thereby. In addition, the refracting layer 33 and the second optical layer 31 formed over the refracting layer 33 are capable of converging the off-axis light beams (L1, L2) (refer to FIG. 2) toward the optical axis (OA). Consequently, the luminance brightness of the on-axis light beams of the backlight module is increased.

Since the optical multilayer film 3 of the present invention is fully constructed as a unit in advance of the assembly of the backlight module, the assembly of the backlight module is simplified, and dust can be effectively prevented from entering between the two optical layers 31, 32 during assembly of the backlight module, thereby preventing degradation in the optical characteristics of the backlight module as experienced in the prior art.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical multilayer film comprising:
   a first optical layer having a light-exit surface;
   a second optical layer having a light-incoming surface facing the light-exit surface of the first optical layer, and a light-outgoing surface opposite to the light-incoming surface and the light-outgoing surface formed with a light-converging structure; and
   a refracting layer disposed between and in contact with the first optical layer and the second optical layer, made from a transparent material, and having a refractive index that is smaller than a refractive index of the second optical layer.

2. The optical multilayer film as claimed in claim 1, wherein the refracting layer is made from a transparent resin material.

3. The optical multilayer film as claimed in claim 1, wherein the refractive index of the refracting layer is greater than that of air.

4. The optical multilayer film as claimed in claim 1, wherein the first optical layer is a diffuser layer for diffusing light beams.

5. The optical multilayer film as claimed in claim 4, wherein the diffuser layer has a plurality of microscopic scattering particles blended therein.

6. The optical multilayer film as claimed in claim 1, wherein the light-converging structure is a prismatic structured array.

7. The optical multilayer film as claimed in claim 1, wherein the first optical layer is a diffuser layer, and the second optical layer is a brightness enhancement layer.

8. A backlight module comprising:
   a reflector having a reflective surface;
   at least one light source unit disposed in a space defined by the reflector; and
   an optical multilayer film disposed over the reflector, and including:
      a first optical layer having a light-incident surface facing the light source unit, and a light-exit surface opposite to the light-incident surface;
      a second optical layer having a light-incoming surface facing the light-exit surface of the first optical layer, and a light-outgoing surface opposite to the light-incoming surface and the light-outgoing surface formed with a light-converging structure; and
      a refracting layer disposed between and in contact with the first and second optical layers, made from a transparent material, and having a refractive index that is smaller than a refractive index of the second optical layer.

9. The backlight module as claimed in claim 8, wherein the refracting layer of the optical multilayer film is made from a transparent resin material.

10. The backlight module as claimed in claim 8, wherein the refractive index of the refracting layer of the optical multilayer film is greater than that of air.

11. The backlight module as claimed in claim 8, wherein the first optical layer of the optical multilayer film is a diffuser layer for diffusing light beams.

12. The backlight module as claimed in claim 11, wherein the diffuser layer has a plurality of microscopic scattering particles blended therein.

13. The backlight module as claimed in claim 8, wherein the light-converging structure of the light-outgoing surface of the second optical layer of the optical multilayer film is a prismatic structured array.

14. The backlight module as claimed in claim 8, wherein the light source unit is a cold cathode fluorescent lamp unit.

15. The backlight module as claimed in claim 8, wherein the light source unit is a light emitting diode lamp unit.

16. The backlight module as claimed in claim 8, wherein the first optical layer of the optical multilayer film is a diffuser layer, and the second optical layer is a brightness enhancement layer.

* * * * *